(12) United States Patent
Spickenheier

(10) Patent No.: US 11,506,233 B2
(45) Date of Patent: Nov. 22, 2022

(54) SPRING ELEMENT

(71) Applicant: WITTE Automotive GmbH, Velbert (DE)

(72) Inventor: Klaus Spickenheier, Iserlohn (DE)

(73) Assignee: WITTE Automotive GmbH, Velbert (DE)

( * ) Notice: Subject to any disclaimer, the term of this patent is extended or adjusted under 35 U.S.C. 154(b) by 0 days.

(21) Appl. No.: 17/401,120

(22) Filed: Aug. 12, 2021

(65) Prior Publication Data

US 2022/0049733 A1 Feb. 17, 2022

(30) Foreign Application Priority Data

Aug. 13, 2020 (DE) ..................... 102020121339.5

(51) Int. Cl.
*F16B 5/02* (2006.01)

(52) U.S. Cl.
CPC .................... *F16B 5/025* (2013.01)

(58) Field of Classification Search
CPC ............... F16B 5/025; F16B 1/02; F16B 1/36
See application file for complete search history.

(56) References Cited

U.S. PATENT DOCUMENTS

| | | | |
|---|---|---|---|
| 3,861,776 A | 1/1975 | Deal | |
| 5,474,479 A * | 12/1995 | Bennett | H01R 13/187 439/843 |
| 5,667,413 A | 9/1997 | Trafton | |
| 6,042,432 A | 3/2000 | Hashizawa et al. | |
| 7,226,263 B2 * | 6/2007 | Schwarzbich | F16B 5/0233 411/546 |
| 8,202,033 B2 * | 6/2012 | Choi | B62D 27/065 411/546 |
| 2005/0047893 A1 * | 3/2005 | Schwarzbich | F16B 5/0233 411/546 |

(Continued)

FOREIGN PATENT DOCUMENTS

| | | | |
|---|---|---|---|
| DE | 3216880 A1 | 11/1983 | |
| DE | 102004048436 A1 * | 4/2006 | ............. F16B 19/02 |

(Continued)

OTHER PUBLICATIONS

DE-102004048436-A1 English translation (Year: 2006).*

*Primary Examiner* — Jason L Vaughan
*Assistant Examiner* — Amanda Kreiling
(74) *Attorney, Agent, or Firm* — Wiggin and Dana LLP

(57) ABSTRACT

The present disclosure relates to a spring element for a device for compensating for tolerances between a first component and a second component, wherein the spring element comprises: at least two axial webs extending in the direction of a longitudinal center axis of the spring element and spaced apart from one another in the circumferential direction of the spring element, each of which, viewed in the direction of the longitudinal center axis of the spring element, has two opposite end sections connected by an intermediate section, wherein the end sections of an axial web have at least approximately the same radial distance from the longitudinal center axis of the spring element and the intermediate section arranged between these end sections has a different radial distance from the longitudinal center axis; and at least one connecting ring which connects the axial webs to one another.

17 Claims, 1 Drawing Sheet

(56) References Cited

U.S. PATENT DOCUMENTS

2010/0029143 A1\* 2/2010 Cossette .............. H01R 13/426
439/745

FOREIGN PATENT DOCUMENTS

| DE | 102004048436 A1 | 4/2006 |
| DE | 202007013238 U1 | 2/2009 |
| DE | 102016118640 A1 | 4/2018 |
| DE | 102018113895 A1 | 12/2019 |

\* cited by examiner

SPRING ELEMENT

TECHNICAL FIELD

The present disclosure relates to a spring element for a device for compensating for tolerances between a first component and a second component and to a device for compensating for tolerances between a first component and a second component.

BACKGROUND

Such devices, which are also referred to as tolerance compensation devices, are generally known and have, for example, a base element which can be attached to one component, and a compensation element which is in thread engagement with the base element and which can be brought into contact with the other component by unscrewing it from the base element. A connecting means, such as a connecting screw or a threaded bolt, which can be pushed through a passage provided both in the base element and in the compensation element, is used to connect the two components.

The compensation element is unscrewed by turning the inserted connecting means. For the necessary torque transmission, a spring element is arranged in the passage of the compensation element, which on the one hand is supported on the compensation element and on the other hand presses against the connecting means inserted through the passage.

So that the spring element located in the passage cannot be accidentally pulled out of the passage again and in the worst case completely lost, the spring element is provided with radially outwardly projecting barbs, by means of which the spring element claws into the passage, whereby the spring element is securely held in the passage. For this purpose, the barbs are usually formed on opposite axial end sides of the spring element.

In this case, however, the problem arises during the installation of the spring element that when the spring element is inserted into the passage of the tolerance compensation device, the barbs formed at the end come into contact with the compensation element at the beginning of the insertion process into the passage, whereby an increased effort is required to install the spring element in the passage. Furthermore, it is disadvantageous that in the opposite direction to the installation direction, locking barbs can no longer fulfill their function due to their terminal position on the spring element if the spring element has nevertheless been moved slightly out of the passage, since the barbs can then no longer claw into the passage due to their terminal position.

It is therefore an object of the present disclosure to create a spring element which is easier to install and which is held securely after installation.

DETAILED DESCRIPTION

The object is achieved by a spring element. The spring element according to the present disclosure comprises at least two axial webs extending in the direction of a longitudinal center axis of the spring element and spaced apart from one another in the circumferential direction of the spring element, each of which, viewed in the direction of the longitudinal center axis of the spring element, has two opposite end sections connected by an intermediate section. The end sections of an axial web have at least approximately the same radial distance from the longitudinal center axis of the spring element and the intermediate section arranged between these end sections has a different radial distance from the longitudinal center axis. In addition, at least one connecting ring connects the axial webs to one another. The spring element according to the present disclosure is characterized by at least one claw section which is spaced apart in the axial direction from the end sections of the axial webs and which extends obliquely outward with respect to the longitudinal center axis.

The present disclosure is based on the general idea that a spring element can be more easily inserted into a passage of a tolerance compensation element by at least one claw section, in contrast to the barbs of already known spring elements, which are not formed on the axial end sides of the spring element, but are spaced apart in the axial direction from end sections of the spring element. The spring element can thus be inserted into the passage of the tolerance compensation element without the claw section immediately engaging with an inner wall of the passage. This has the advantage that the spring element can be inserted into the passage with less effort.

As a result of the position of the claw section which is spaced apart in the axial direction from the end sections of the spring element, there is also the advantage in the case of a spring element fully installed in the passage that the claw section claws into the passage over a longer distance when the spring element is pulled out of the passage, whereby pulling out the spring element is made more difficult and an already installed spring element can at best no longer be lost.

The claw section extending obliquely with respect to the longitudinal center axis has both an extension component in the axial direction and an extension component in the radial direction. The axial direction is defined by the longitudinal center axis of the spring element. The radial direction extends at right angles to the longitudinal center axis. In this context it should be mentioned that the axial webs surround the longitudinal center axis.

Advantageous embodiments of the present disclosure can be found in the dependent claims, the description and the drawings.

So that the claw section can effectively claw into the passage of the tolerance compensation device, it is advantageous if the claw section projects beyond the end sections in the radial direction.

For a particularly elastic design of the spring element in the circumferential direction, the connecting ring preferably lies in a plane which is oriented transversely, in particular at right angles, to the longitudinal center axis.

In addition, it is advantageous for a particularly elastic design if the spring element is made of spring steel. The spring element can be designed in a simple manner as a stamped and bent part. However, it is also conceivable to manufacture the spring element from another rigid and at the same time deflectable material. For example, the spring element can also be made of a plastics material.

According to an advantageous embodiment, the radial distances between the end sections of an axial web are greater than a maximum radial distance of the intermediate section arranged between these end sections. This gives the spring element a waisted shape, so that only the end sections of the installed spring element are supported on a passage delimiting wall of the tolerance compensation device. On the inside of the spring element, the waisted section is used to rest against the connecting means, i.e. the intermediate sections of the axial webs accommodate the connecting means between them.

However, it is also conceivable that the spring element is designed to be bulbous. In this case, the respective intermediate sections of the axial webs would have a greater radial distance from the longitudinal center axis of the spring element than the corresponding end sections.

In principle, a trap-like or funnel-like configuration is also conceivable in which, compared to the radial distance between the intermediate section and the longitudinal center axis, one end section has a greater radial distance from the longitudinal center axis and the correspondingly opposite other end section has a smaller radial distance from the longitudinal center axis of the spring element.

According to an embodiment of the spring element that is particularly easy to manufacture, at least one claw section emerges from the connecting ring. In this case, the claw section can, for example, already be punched out when the spring element is punched out. Preferably, at least one claw section, viewed in the circumferential direction of the spring element, can be formed between two axial webs on the connecting ring.

Additionally or alternatively, at least one claw section can emerge from one of the axial webs. This can be achieved, for example, in that the claw section is partially punched out of the axial web and bent with its free end away from the axial web.

In particular, the or each claw section can taper in the direction of its free end. As a result, the claw section can claw particularly effectively into the passage of the tolerance compensation device, since the tip can be pressed particularly easily into the inner wall of the passage.

So that the spring element can be easily inserted into the passage of the tolerance compensation device, a free end of the or each claw section can point in the direction of a center plane of the spring element which is oriented perpendicular to the longitudinal center axis and centrally between the end sections of the axial webs. In principle, however, it is also conceivable that at least one claw section points away with its free end in the direction of the center plane of the spring element. Furthermore, it is also possible for at least one claw section to point with its free end in the direction of the center plane of the spring element and at least one further claw section to point away from the center plane with its free end. In particular, all claw sections can be oriented in the opposite direction to the installation direction of the spring element.

According to an advantageous embodiment of the spring element, the connecting ring can connect the axial webs to one another in the region of one of their end sections, while the other opposite end sections are not connected by a connecting ring. In other words, each axial web has a free end section and an opposing connected end section, wherein the connected end sections are connected by the connecting ring.

According to a further advantageous embodiment of the spring element, the connecting ring can connect the axial webs to one another in the region of their intermediate sections, so that the connecting ring, viewed in the axial direction, is formed between free end sections of the axial webs. In this case, at least one claw section is preferably formed on opposite sides of the connecting ring.

According to a particularly preferred embodiment of the spring element, a first connecting ring connects the axial webs in the region of one of their end sections and a second connecting ring connects the axial webs in the region of their other opposite end sections. Thus, both pairs of end sections are each connected by a connecting ring.

In all of the embodiments described above, at least one claw section is particularly preferably formed on the or each connecting ring.

Preferably, the center plane of the spring element aligned perpendicular to the longitudinal center axis defines a first half and a second half of the spring element, wherein at least one claw section of the first half faces at least one claw section of the second half. As a result, the spring element can be inserted into the passage of the tolerance compensation device with one of its axial ends or also with its other axial end. In this context, it is also advantageous if the spring element is designed to be mirror-symmetrical with respect to the center plane.

So that the spring element is elastic in the circumferential direction, the or each connecting ring can have a slot, whereby the spring element can be compressed resiliently in the circumferential direction while reducing the gap dimension of the slot. The slot is preferably aligned axially. If the spring element has several connecting rings, the slots of all connecting rings can have a common axial alignment.

The present disclosure also relates to a device for compensating for tolerances between a first component and a second component with a base element, a compensation element which engages with the base element and in which a passage for a connecting means is formed, and a spring element of the type described above, which is arranged in the passage of the compensation element. To arrange the spring element in the passage, the spring element can be inserted into the passage in an installation direction. The assembly direction and the longitudinal center axis are preferably aligned parallel to one another.

So that the spring element does not initially claw into the passage when it is inserted into the passage, but can be easily inserted, the end sections can be upstream of the or each claw section in the assembly direction. As a result, the claw sections of the spring element only come into engagement with the passage after a predetermined distance.

After the spring element has been installed in the passage of the tolerance compensation device, it is advantageous if the spring element cannot be easily pulled out of the passage. For this purpose, at least one claw section can lock against displacement of the spring element in a direction opposite to the installation direction.

The present disclosure is described below purely by way of example using a possible embodiment with reference to the accompanying drawings. In the drawings.

Figure 2:
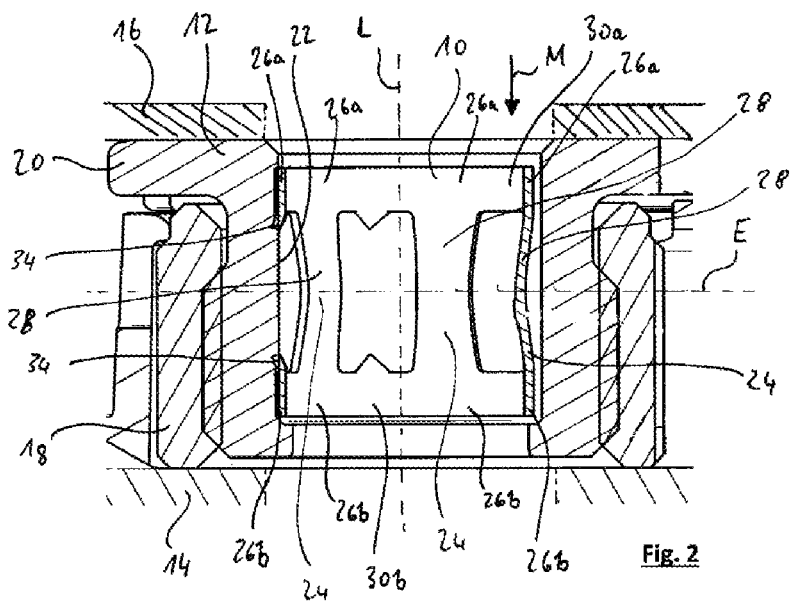
FIG. 2 is a sectional view of a device for compensating for tolerances with a spring element of FIG. 1 arranged in a passage of the device.

The figures show a spring element 10 for a device 12, shown in FIG. 2, for compensating for tolerances between a first component 14 and a second component 16.

The device 12 comprises a base element 18 which can be attached to the first component 14 in FIG. 2. The base element 18 is in thread engagement with a compensation element 20, so that the compensation element 20 can be brought into contact with the second component 16 by unscrewing it from the base element 18.

A connecting means (not shown in the figures), is used to connect the two components 14, 16, which can be designed, for example, in the form of a connecting screw or a threaded bolt. For this purpose, the connecting means can be pushed through in the base element 18 as well as in the passage 22 provided in the compensation element 20.

By rotating the connecting means, the compensation element 20 can be unscrewed from the base element 18 until the compensation element 20 comes into contact with the second component 16. For the necessary torque transmission from the connecting means to the compensation element 20, the spring element 10 is arranged in the passage 22 of the compensation element 20 (FIG. 2). On the one hand, the spring element 10 is supported on the compensation element 20 in a frictional and/or non-positive manner and, on the other hand, the spring element 10 presses in a frictional and/or non-positive manner against the connecting means inserted through the passage.

After the compensation element 20 has come into contact with the second component 16, a distance between the first component 14 and the second component 16 is reliably bridged by the device 12 and the connecting means. It should be understood that a lock nut (also not shown in the figures) can be provided for the connecting means.

Figure 1:
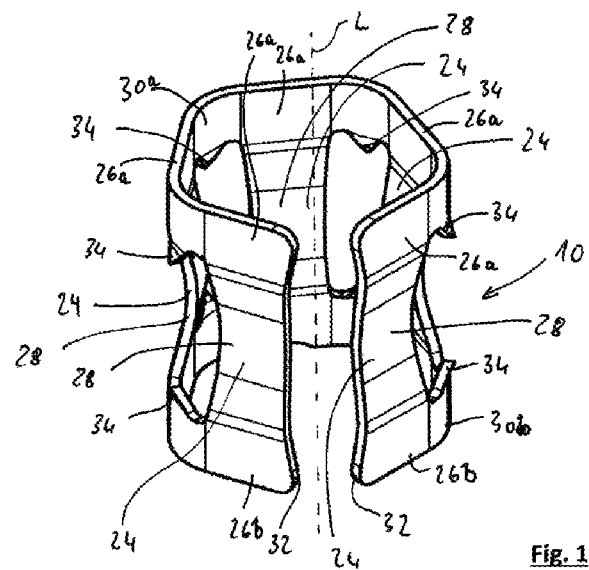
FIG. 1 is a perspective view of a spring element.

With reference to FIG. 1, the structure of the spring element 10 will now be explained in more detail.

The spring element 10 shown in FIG. 1 specifically comprises five axial webs 24 extending in the direction of a longitudinal center axis L of the spring element 10. The number of axial webs 24 can also differ from five. It is also conceivable that the spring element 10 can have fewer than five axial webs 24, for example three or four axial webs 24, or more than five axial webs 24, for example six, seven or more axial webs 24. However, the spring element 10 has at least two axial webs 24.

Each of the axial webs 24 has two opposite end sections 26, which are connected to one another in the axial direction by an intermediate section 28 arranged between the end sections 26.

As can be seen from the figures, the radial distances between the end sections 26 and the longitudinal center axis L of the spring element 10 are greater than the maximum radial distances between the respective intermediate sections 28 and the longitudinal center axis L of the spring element 10. In this case, all end sections 26 have at least approximately the same radial distance from the longitudinal center axis L of the spring element 10. Overall, this gives the spring element 10 a waisted shape.

However, it is also conceivable that the spring element 10 has a bulbous shape, which is not shown in the embodiments. If the spring element 10 is bulbous, the radial distances between the end sections 26 and the longitudinal center axis L are correspondingly smaller than the maximum radial distances between the respective intermediate sections 28 and the longitudinal center axis L of the spring element 10.

As can also be seen from the figures, the axial webs 24 are connected to one another at a distance from one another both at the first end sections 26 and at the other opposite end sections 26 by means of a connecting ring 30 aligned transversely to the longitudinal center axis L of the spring element 10. Specifically, a first connecting ring 30a connects the axial webs 24 in the region of their first end sections 26a and a second connecting ring 30b connects the axial webs 24 in the region of their other opposite end sections 26b.

In this context, however, it is also conceivable that the axial webs 24 of a spring element 10 are connected to one another by means of only one connecting ring 30. In this case, for example, only end sections 26 located at the same axial height can be connected to one another by means of a connecting ring 30, whereas the other opposite end sections 26 are not connected to one another. In addition, the connecting ring 30, viewed in the axial direction, can be formed between the end sections 26 in order to connect the intermediate sections 28 of the axial webs 24 to one another so that all end sections 26 are free.

The connecting rings 30a, 30b each have a slot 32 so that the spring element 10 is designed to be resilient in the circumferential direction. The slots 32 of the connecting rings 30a, 30b extend in a common axial direction of extension (FIG. 1).

So that the spring element 10 is securely held in the passage 22 of the compensation element 20, the spring element 10 has several claw sections 34 which extend obliquely outward with respect to the longitudinal center axis L of the spring element 10 and which taper towards their respective free ends. As can be seen from the figures, the free ends of the claw sections 34 project further outward in the radial direction than the end sections 26 of the spring element 10 in order to enable particularly secure clawing of the spring element 10 into the passage 22 of the compensation element 20.

The claw sections 34 each emerge from the connecting rings 30a, 30b at a distance from the end sections 26 in the axial direction. Furthermore, the claw sections 34 are formed between the axial webs 24, viewed in the circumferential direction of the spring element 10. Additionally or alternatively, at least one claw section 34 could also emerge from at least one of the axial webs 24. In any case, the free ends of the claw sections 34 in the illustrated embodiment point with their free ends in the direction of a center plane E of the spring element 10 (FIG. 2) oriented perpendicular to the longitudinal center axis L of the spring element 10.

As can be seen particularly with reference to FIG. 1, the claw sections 34 are spaced apart in the axial direction and aligned in pairs opposite one another. In particular, the claw sections 34 of a first half of the spring element 10 defined by the center plane E are aligned opposite to the claw sections 34 of a second half of the spring element 10, so that the free ends of the claw sections 34 of the first half and the free ends of the claw sections 34 of the second half face one another. As can also be seen from the figures, the spring element has a mirror-symmetrical structure with respect to the center plane E, whereby the spring element 10 can be easily inserted into the passage 22 of the compensation element 20 with both of its axial ends.

The insertion of the spring element 10 into the passage 22 of the compensation element 20 takes place in the direction of an installation direction M (see arrow M in FIG. 2). As a result of the axial spacing of the claw sections 34 in relation to the end sections 26 of the axial webs 24, the end sections 26 are upstream of the claw sections 34 in the axial direction in the installation direction M, whereby the spring element 10 can initially be inserted into the passage 22 of the compensation element 20 without clawing with less force.

After the spring element 10 has been inserted into the passage 22 of the compensation element 20, the claw sections 34 oriented opposite to the installation direction M block against displacement of the spring element 10 in the direction opposite to the installation direction M, so that the spring element 10 is securely held in the passage 22 of the compensation element 20.

LIST OF REFERENCE SIGNS

10 Spring element
12 Device
14 First component
16 Second component
18 Base element
20 Compensation element 22 Passage
24 Axial web
26 End section
26a End section
26b End section opposite to 26a
28 Intermediate section
30 Connecting ring
30a First connecting ring
30b Second connecting ring
32 Slot
34 Claw section
L Longitudinal center axis
E Center plane
M Assembly direction

I claim:

1. A spring element for a device for compensating for tolerances between a first component and a second component, the spring element comprising:
    at least two axial webs extending in the direction of a longitudinal center axis of the spring element and spaced apart from one another in the circumferential direction of the spring element, each one of the at least two axial webs, viewed in the direction of the longitudinal center axis of the spring element, has two opposite end sections connected by an intermediate section, wherein the end sections of an axial web have at least approximately the same radial distance from the longitudinal center axis and the intermediate section arranged between these end sections has a different radial distance from the longitudinal center axis;
    at least one connecting ring which connects the axial webs to one another; and
    at least one claw section which is spaced apart in the axial direction from the end sections of the axial webs and which extends obliquely outward with respect to the longitudinal center axis.

2. The spring element according to claim 1,
    wherein the radial distances between the end sections of an axial web are greater than a maximum radial distance of the intermediate section arranged between these end sections.

3. The spring element according to claim 1,
    wherein at least one claw section emerges from the connecting ring and/or from one of the axial webs.

4. The spring element according to claim 1,
    wherein the or each claw section tapers in the direction of its free end.

5. The spring element according to claim 1,
    wherein a free end of the or each claw section points in the direction of a center plane of the spring element which is oriented perpendicular to the longitudinal center axis.

6. The spring element according to claim 1,
    wherein the connecting ring connects the axial webs to one another in the region of one of their end sections, while the other opposite end sections are not connected by a connecting ring.

7. The spring element according to claim 1,
    wherein the connecting ring connects the axial webs to one another in the region of their intermediate sections.

8. The spring element according to claim 1,
    wherein a first connecting ring connects the axial webs in the region of one of their end sections and a second connecting ring connects the axial webs in the region of their other opposite end sections.

9. The spring element according to claim 7,
    wherein a center plane of the spring element oriented perpendicular to the longitudinal center axis defines a first half and a second half of the spring element, wherein at least one claw section of the first half of the spring element faces at least one claw section of the second half of the spring element.

10. The spring element according to claim 9,
    wherein the spring element is designed to be mirror-symmetrical with respect to the center plane.

11. The spring element according to claim 8,
    wherein a center plane of the spring element oriented perpendicular to the longitudinal center axis defines a first half and a second half of the spring element, wherein at least one claw section of the first half of the spring element faces at least one claw section of the second half of the spring element.

12. The spring element according to claim 11,
    wherein the spring element is designed to be mirror-symmetrical with respect to the center plane.

13. The spring element according to claim 1,
    wherein the or each connecting ring has a slot.

14. The spring element according to claim 13,
    wherein the slots of all connecting rings are axially aligned.

15. A device for compensating for tolerances between a first component and a second component with a base element, a compensation element which engages with the base element and in which a passage for a connecting means is formed, and a spring element which is arranged in the passage of the compensation element, the spring element comprising:
    at least two axial webs extending in the direction of a longitudinal center axis of the spring element and spaced apart from one another in the circumferential direction of the spring element, each one of the at least two axial webs, viewed in the direction of the longitudinal center axis of the spring element, has two opposite end sections connected by an intermediate section, wherein the end sections of an axial web have at least approximately the same radial distance from the longitudinal center axis and the intermediate section arranged between these end sections has a different radial distance from the longitudinal center axis;
    at least one connecting ring which connects the axial webs to one another; and
    at least one claw section which is spaced apart in the axial direction from the end sections of the axial webs and which extends obliquely outward with respect to the longitudinal center axis.

16. The device according to claim 15,
    wherein the spring element for arrangement in the passage can be inserted into the passage in an installation direction and the end sections are upstream of the or each claw section in the installation direction.

17. The device according to claim 16,
    wherein the spring element for arrangement in the passage can be inserted into the passage in an installation direction and at least one claw section locks against displacement of the spring element in a direction opposite to the installation direction.

* * * * *